US010229419B2

(12) United States Patent
Sion

(10) Patent No.: US 10,229,419 B2
(45) Date of Patent: Mar. 12, 2019

(54) DEVICE, SYSTEM, AND METHOD OF DYNAMIC MODIFICATION OF SALE TERMS OF ELECTRONIC TRANSACTIONS

(75) Inventor: Lior Sion, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 1144 days.

(21) Appl. No.: 11/961,451

(22) Filed: Dec. 20, 2007

(65) Prior Publication Data

US 2009/0164295 A1  Jun. 25, 2009

(51) Int. Cl.
G06Q 30/02 (2012.01)
G06Q 30/06 (2012.01)
G06Q 10/06 (2012.01)

(52) U.S. Cl.
CPC ..... *G06Q 30/02* (2013.01); *G06Q 10/063114* (2013.01); *G06Q 30/0601* (2013.01)

(58) Field of Classification Search
CPC ........ G06Q 30/02; G06Q 10/08; G06Q 10/06; G06Q 30/06
USPC ..................................... 705/26, 27, 28, 37, 7
See application file for complete search history.

(56) References Cited

U.S. PATENT DOCUMENTS

| 7,447,646 | B1 * | 11/2008 | Agarwal et al. ................ 705/26 |
| 8,108,271 | B1 * | 1/2012 | Duncan ................ G06Q 10/087 705/28 |
| 2002/0116348 | A1 * | 8/2002 | Phillips .................. G06Q 30/02 705/400 |
| 2002/0147767 | A1 * | 10/2002 | Brice ..................... G06Q 30/02 709/203 |
| 2003/0200185 | A1 * | 10/2003 | Huerta et al. ................ 705/400 |
| 2004/0019552 | A1 * | 1/2004 | Tobin .............................. 705/37 |
| 2004/0215527 | A1 * | 10/2004 | Grove ................ G06Q 30/0633 705/26.3 |
| 2005/0015308 | A1 * | 1/2005 | Grove ................ G06Q 30/0601 705/26.3 |
| 2005/0022129 | A1 * | 1/2005 | Borenstein et al. .......... 715/734 |
| 2005/0027641 | A1 * | 2/2005 | Grove .................... G06Q 30/02 705/37 |
| 2005/0138637 | A1 * | 6/2005 | Porter et al. .................. 719/316 |
| 2006/0143109 | A1 * | 6/2006 | Goel .............................. 705/37 |
| 2006/0293994 | A1 * | 12/2006 | Stuart ................ G06Q 30/0601 705/37 |
| 2007/0050206 | A1 * | 3/2007 | Whikehart et al. ............... 705/2 |
| 2007/0073593 | A1 * | 3/2007 | Perry .................... G06Q 30/02 705/26.64 |

(Continued)

FOREIGN PATENT DOCUMENTS

KR    4089462 A    10/2004

OTHER PUBLICATIONS

Tak-Lam Wong et al.; "Hot Item Mining and Summarization from Multiple Auction Web Sites"; Fifth IEEE International Conference on Data Mining; 2005; pp. 1-4; vol. 27, Issue 30.

*Primary Examiner* — Nga B Nguyen
(74) *Attorney, Agent, or Firm* — Sughrue Mion, PLLC

(57) ABSTRACT

Device, system, and method of dynamic modification of sale terms of electronic transactions. For example, a system for electronic transactions includes a computer to store a set of sale terms associated with a product offered for sale, to receive a supply/demand alert associated with the product, to automatically modify one or more terms of the set of sale terms based on the supply/demand alert, and to provide to a client device the modified set of sale terms.

20 Claims, 2 Drawing Sheets

(56) References Cited

U.S. PATENT DOCUMENTS

2008/0162270 A1\* 7/2008 Kim et al. ...................... 705/10
2008/0208606 A1\* 8/2008 Allsop .............. G06F 17/30867
                                                      705/1.1

\* cited by examiner

DEVICE, SYSTEM, AND METHOD OF DYNAMIC MODIFICATION OF SALE TERMS OF ELECTRONIC TRANSACTIONS

FIELD

Some embodiments of the invention are related to the field of electronic commerce systems.

BACKGROUND

Some electronic commerce (E-commerce) systems allow users to purchase goods or services using the Internet or the World Wide Web. For example, a user may utilize a computer to visit an Internet web-site (e.g., Amazon) which provides an online catalog of products available for sale at a pre-defined price. The user selects a product, views a description of the product as well as the product sale price, and adds the product to an electronic (or virtual) shopping cart associated with the user. The user then completes the transaction by paying (e.g., by providing details of his credit card) and by providing a shipping address.

Alternatively, the user may utilize a computer to visit an Internet web-site (e.g., eBay) which provides a service of online auctions. The user selects a product which is offered for auction; views a description of the product as well as the pre-defined terms of the particular online auction; and submits an offer (namely, a bid). Once the auction closes, a "winner" is determined out of the one or more users that submitted bids, and the auctioned item is sold to the winning user.

SUMMARY

Some embodiments of the invention include, for example, devices, systems and methods of dynamic modification of sale terms of electronic transactions.

In some embodiments, for example, a system for electronic transactions includes: a computer to store a set of sale terms associated with a product offered for sale, to receive a supply/demand alert associated with the product, to automatically modify one or more terms of the set of sale terms based on the supply/demand alert, and to provide to a client device the modified set of sale terms.

In some embodiments, the supply/demand alert includes an alert indicating high demand for the product based on one or more time-related conditions, and the system includes a time-based alert generator to generate the alert.

In some embodiments, the supply/demand alert includes an alert indicating high demand for the product based on one or more date-related conditions, and the system includes a date-based alert generator to generate the alert.

In some embodiments, the supply/demand alert includes an alert indicating high demand for the product based on one or more event-related conditions, and the system includes an event-based alert generator to generate the alert.

In some embodiments, the supply/demand alert includes an alert indicating increased demand for the product, and the system includes a demand calculator to generate the alert.

In some embodiments, the supply/demand alert includes an alert indicating low inventory for the product, and the system includes a low inventory alert generator to generate the alert.

In some embodiments, the system includes: a modification determination module to receive the supply/demand alert, and to determine based on one or more pre-defined sale terms modification rules and based on one or more product filters whether or not to modify one or more terms of the set of sale terms.

In some embodiments, the system includes: a sale terms modifier module to modify one or more terms of the set of sale terms based on the one or more pre-defined sale terms modification rules.

In some embodiments, the sale terms modifier module is to transfer the product from a fixed-price transaction route to an online auction route.

In some embodiments, the system includes: an auction module to automatically generate an online auction for the product based on one or more pre-defined auction generation rules.

In some embodiments, the auction module is to automatically determine an auction opening price based on a calculation that takes into account a previous price of the product in the fixed-price transaction route.

In some embodiments, the computer is to generate a notification indicating to one or more client devices that one or more of the set of sale terms for the product are modified.

In some embodiments, a method for electronic transactions includes: storing a set of sale terms associated with a product offered for sale; receiving a supply/demand alert associated with the product; automatically modifying one or more terms of the set of sale terms based on the supply/demand alert; and providing to a client device the modified set of sale terms.

In some embodiments, a system for online transactions includes: a product database to store a set of sale terms associated with a product offered for sale in a fixed-price transaction route; a supply/demand alert generator to generate a supply/demand alert associated with the product, the supply/demand alert selected from the group consisting of an alert indicating increased demand for the product, and an alert indicating low inventory for the product; and an electronic commerce server to automatically modify the set of sale terms associated with the product from a fixed-price transaction route to an online auction route based on one or more pre-defined sale terms modification rules, to automatically generate an online auction for the product based on one or more pre-defined auction generation rules, and to automatically determine an auction opening price based on a calculation that takes into account a previous price of the product in the fixed-price transaction route.

Some embodiments may include, for example, a computer program product including a computer-useable medium including a computer-readable program, wherein the computer-readable program when executed on a computer causes the computer to perform methods in accordance with some embodiments of the invention.

Some embodiments of the invention may provide other and/or additional benefits and/or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
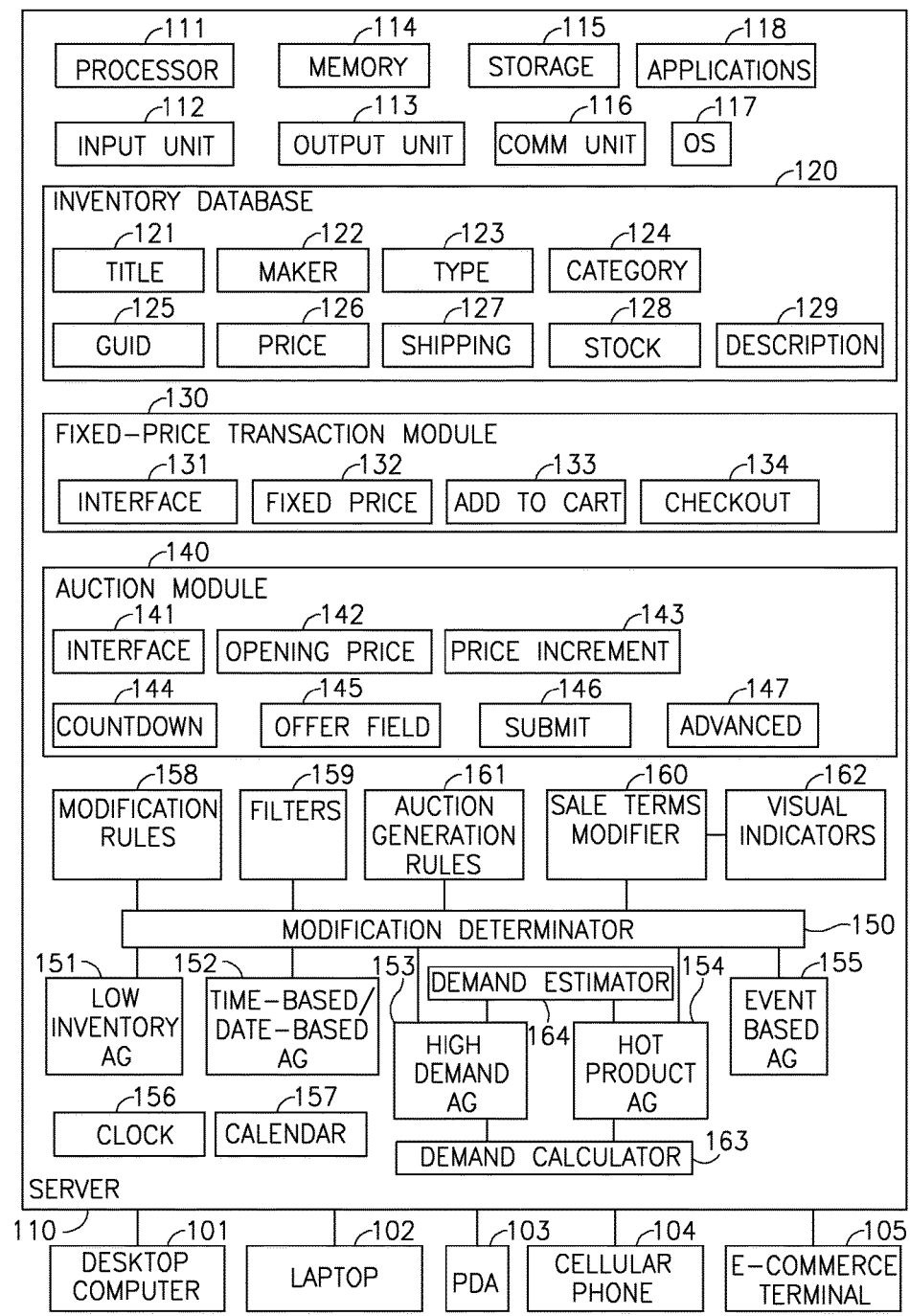
FIG. 1 is a schematic block diagram illustration of a system in accordance with some demonstrative embodiments of the invention.

In the following detailed description, numerous specific details are set forth in order to provide a thorough understanding of some embodiments of the invention. However, it will be understood by persons of ordinary skill in the art that embodiments of the invention may be practiced without these specific details. In other instances, well-known methods, procedures, components, units and/or circuits have not been described in detail so as not to obscure the discussion.

Discussions herein utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein includes, for example, "multiple" or "two or more". For example, "a plurality of items" includes two or more items.

Although portions of the discussion herein relate, for demonstrative purposes, to wired links and/or wired communications, embodiments of the invention are not limited in this regard, and may include one or more wired or wireless links, may utilize one or more components of wireless communication, may utilize one or more methods or protocols of wireless communication, or the like. Some embodiments of the invention may utilize wired communication and/or wireless communication.

Some embodiments of the invention may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device (e.g., a device incorporating functionalities of multiple types of devices, for example, PDA functionality and cellular phone functionality), a vehicular device, a non-vehicular device, a mobile or portable device, a non-mobile or non-portable device, a wireless communication station, a wireless communication device, a wireless Access Point (AP), a wireless Base Station, a Mobile Subscriber Station (MSS), a wired or wireless Network Interface Card (NIC), a wired or wireless router, a wired or wireless modem, a wired or wireless network, a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), devices and/or networks operating in accordance with existing IEEE 802.11, 802.11a, 802.11b, 802.11g, 802.11n, 802.16, 802.16d, 802.16e, 802.16m standards and/or future versions and/or derivatives and/or Long Term Evolution (LTE) of the above standards, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or tag or transponder, a device which utilizes Near-Field Communication (NFC), a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, a wired or wireless handheld device (e.g., BlackBerry, Palm Treo), a Wireless Application Protocol (WAP) device, or the like.

Some embodiments of the invention may be used in conjunction with one or more types of wireless communication signals and/or systems, for example, Radio Frequency (RF), Infra Red (IR), Frequency-Division Multiplexing (FDM), Orthogonal FDM (OFDM), OFDM Access (OFDMA), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, Multi-Carrier Modulation (MDM), Discrete Multi-Tone (DMT), Bluetooth®, Global Positioning System (GPS), IEEE 802.11 ("Wi-Fi"), IEEE 802.16 ("Wi-Max"), ZigBee™, Ultra-Wideband (UWB), Global System for Mobile communication (GSM), 2G, 2.5G, 3G, Third Generation Partnership Project (3GPP), 3.5G, or the like. Embodiments of the invention may be used in various other devices, systems and/or networks.

The term "product" as used herein includes, for example, a tangible product; a non-tangible product (e.g., a subscription to a web-site); a service to be provided by a web-site (e.g., a download-able file, streaming audio/video, or the like); a service to be provided by non-virtual entities (e.g., tutoring lessons to be provided by a private teacher, or home moving services); products and/or services that have a limited inventory or a limited supply; products or services that have a substantially unlimited inventory or a substantially unlimited supply; products or services which may be sold, or offered for sale, through a fixed-price transaction mechanism; products or services which may be sold, or offered for sale, through an auction or an online auction mechanism; products or services which may be sold, or offered for sale, through a web-site or web-page or Internet application; products or services which may be sold, or offered for sale, through an electronic commerce system; or the like.

The term "sale terms" as used herein includes, for example, one or more terms in which a product is offered (or may be offered) for sale; one or more sale terms or parameters of a fixed-price transaction or offer; one or more sale terms or parameters of an auction; or the like.

The term "supply/demand alert" as used herein includes, for example, an alert regarding a supply of a product, an alert regarding a demand of a product, an alert regarding a supply and/or a demand of a product, an alert indicating change in supply of a product, an alert indicating change in demand of a product, an alert indicating change in supply and/or demand of a product, an alert indicating increase in supply of a product, an alert indicating increase in demand of a product, an alert indicating increase in supply and/or demand of a product, an alert indicating decrease in supply of a product, an alert indicating decrease in demand of a product, an alert indicating decrease in supply and/or demand of a product, and/or other suitable alerts.

At an overview, some embodiments of the invention provide devices, systems and method of dynamic modification of sale terms of electronic transactions or online transactions. For example, an electronic commerce server offers products for sale using one or more transaction routes, for example, a fixed-price transaction route and an online auction route. In some embodiments, a product offered for sale is dynamically transferred by the server from a first transaction route (e.g., fixed-price) to a second transaction route (e.g., online auction), or vice versa, based on pre-defined conditions or criteria. Furthermore, the terms of sale in the second route may automatically and dynamically be defined by the server, based on pre-defined criteria and rules set in advance by the operator of server.

Some embodiments thus allow on-demand establishment of online auction on by a server of a web-site, or other dynamic ad-hoc modification of sale terms of products offered for sale online. Some embodiments allow the server to automatically adapt to a mass number of users that attempt to buy (or show interest in) certain "hot" products, for example, temporarily (e.g., a new recently-released "Harry Potter" book) or generally (e.g., due to low inventory, seasonal sale, end-of-year sale, or many users purchasing any products that are available). Some embodiments thus provide dynamic, automatic and ad-hoc modification of sale terms.

In some embodiments, when a large number of users visit a web-page in order to buy the same product, the server may automatically identify this situation and provide real-time auction of the product or to modify in real-time sale terms of the product. The auction or the modified sale terms may allow higher paying customers to purchase the last items in the inventory; the auction or the modified sale terms may offer better or faster service to higher paying customers; the auction or the modified sale terms may allow users to lower the price if they join to buy together a product as a group of users. The modifications are performed automatically and ad-hoc, and the web-site operator is not required to monitor the market fluctuations or to determine when an auction may be more beneficial than a fixed-price sale (or vice versa).

In some embodiments, the web-site operator may define in advance certain elements, categories, or descriptive types of products that are offered for sale on the web-site, such that specific items or groups of items may be identified or filtered. Further defined are the terms that trigger an online auction (e.g., number of users requesting the product, number of items left in the inventory, or the like) as well as formulas for automatic establishment of auction parameters (e.g., an opening price which may be smaller or greater than the fixed price; faster or slower shipping; or the like).

Some embodiments may monitor the online behavior of users; for example, once a user views the product or adds the product to her shopping cart, a notification is presented to the user (e.g., using a window, a pop-up, window or message, or the like) offering the user to participate in auction for the product, or notifying the user about the ad-hoc modification of the sale terms. The user may then participate in the online auction, and the new sale terms apply.

FIG. 1 schematically illustrates a block diagram of a system 100 in accordance with some demonstrative embodiments of the invention. System 100 includes a server 110 able to communicate through wired and/or wireless links with one or more client terminals or client devices, for example, devices 101-105.

Client devices 101-105 may include one or more types of devices able to perform at least a portion of an electronic commerce transaction. For example, device 101 is a desktop computer; device 102 is a laptop computer; device 103 is a PDA device; device 104 is a cellular phone; and device 105 is an electronic commerce (e-commerce) terminal. Other types of client devices may be used.

Server 110 includes, for example, a processor 111, an input unit 112, an output unit 113, a memory unit 114, a storage unit 115, and a communication unit 116. Server 110 optionally includes other suitable hardware components and/or software components.

Processor 111 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or other suitable multi-purpose or specific processor or controller. Processor 111 executes instructions, for example, of an Operating System (OS) 117 or of one or more applications 118.

Input unit 112 includes, for example, a keyboard, a keypad, a mouse, a touch-pad, a joystick, a track-ball, a stylus, a microphone, or other suitable pointing unit or input device. Output unit 113 includes, for example, a monitor, a screen, a Cathode Ray Tube (CRT) display unit, a Liquid Crystal Display (LCD) display unit, a plasma display unit, one or more audio speakers or earphones, or other suitable output devices.

Memory unit 114 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 115 includes, for example, a hard disk drive, a floppy disk drive, a Compact Disk (CD) drive, a CD-ROM drive, a Digital Versatile Disk (DVD) drive, an internal or external database or repository, or other suitable removable or non-removable storage units. Memory unit 114 and/or storage unit 115, for example, store data processed by server 110.

Communication unit 116 includes, for example, a wired or wireless transceiver, a wired or wireless modem, a wired or wireless Network Interface Card (NIC), or other unit suitable for transmitting and/or receiving communication signals, blocks, frames, transmission streams, packets, messages and/or data. Communication unit 116 optionally includes one or more antennas.

In some embodiments, some or all of the components of server 110 are enclosed in a common housing or packaging, and are interconnected or operably associated using one or more wired or wireless links. In other embodiments, components of server 110 are distributed among multiple or separate devices or locations.

Server 110 operates to allow sale of one or more products through electronic commerce transactions or auctions, online transactions or auctions, transactions or auctions performed (partially or entirely) through a web-site, or the like. Server 110 may include, or may be associated with, an inventory database 120 able to store information of one or more products offered for sale. For each product, the inventory database 120 stores, for example: a product title 121 (e.g., "The Hobbit"); a manufacturer or maker 122 (e.g., the author "J. R. R. Tolkien" for the book "The Hobbit", a singer or band for an audio Compact Disk (CD), a clothes company for a shirt, a toy company for a toy, or the like); a product type 123 (e.g., "book"); a product category 124 (e.g., "fiction books"); a product Global Unique Identifier (GUID) 125 (e.g., an ISBN number for a book, a SKU number, or the like); a product price 126; shipping information 127 associated with the product (e.g., shipping options, shipping rates, shipping time, or the like); stock status 128 (e.g., product is currently unavailable; product is on back-order; product is pre-ordered and is not yet available; number of items left in stock of the product; number of items that are expected to be in stock of the product; or the like); product description 129 (e.g., textual and/or graphical description of the product, reviews, user comments, user ratings, or the like); and/or other suitable information.

Server 110 offers products for sale using one or more transaction routes, for example, a fixed-price transaction route (e.g., using a fixed-price transaction module 130), an online auction route (e.g., using an auction module 140), or other suitable transaction routes.

For example, the fixed-price transaction module 130 is able to generate an interface 131 for fixed-price transactions, e.g., a web-page showing the fixed price 132, an "add to cart" button 133, a "checkout" button 134, or the like.

Similarly, the auction module 140 is able to generate an interface 141 for online auctions, e.g., a web-page showing an opening price 142, price increments 143 (or a "next price" that a user may bid), a countdown indicator 144 (counting down the time until the auction terminates), an offer field 145 (in which the user enters his bid), a "submit" button 146, and advanced options 147 (e.g., an auto-pilot or auto-bidding mechanism).

In some embodiments, a product offered for sale is dynamically transferred by server 110 from a first transaction route (e.g., fixed-price) to a second transaction route (e.g., online auction), or vice versa, based on pre-defined conditions or criteria. Furthermore, the terms of sale in the second route may be dynamically defined by server 110, based on pre-defined criteria and rules set in advance by the operator of server 110.

A modification determinator module 150 receives input from one or more modules, and dynamically determines whether or not to transfer a product offered for sale from a first transaction route to a second transaction route, or dynamically determines whether or not to modify one or more sale terms associated with the product. For example, the modification determinator module 150 is associated with a low inventory alert generator 151, a time-based or date-based alert generator 152, a high demand alert generator 153, a hot product alert generator 154, an event based alert generator 155, or other alert sources.

The low inventory alert generator 151 periodically checks the stock status 128 of items in the inventory database 120, and generates a low inventory alert if the number of items available for sale of a particular product are smaller than a pre-defined threshold, e.g., less than four items are left in stock, less than five percent of the maximum stock capacity is left, or the like.

The time-based or date-based alert generator 152 is associated with a clock 156 and a calendar 157, and generates a time-based or date-based alerts. For example, the time-based or date-based alert generator 152 generates an alert associated with products of the type "party costumes" a pre-defined time before Halloween; generates an alert associated with products of the type "chocolates" a pre-defined time before Valentine's Day; or the like. In some embodiments, the time-based or date-based alert generator 152 is able to identify hourly patterns or daily patterns in products sales and to generate alerts based on time of day (e.g., if it is determined that a particular product is typically purchased during a particular time slot of the day; for example, if movie tickets are typically purchased in the afternoon); to generate alerts based on day of the week (e.g., if it is determined that a particular product is typically purchased during a particular day of the week; for example, if diet kits are typically purchased on Mondays); to generate alerts based on day of the month (e.g., if it is determined that a particular product is typically purchased during a particular day of the week; for example, if monthly water filters are typically purchased during the first week of the month); to generate alerts based on day or week or month of the year (e.g., if it is determined that a particular product is typically purchased during a particular time slot of the year; for example, if more than 50 percent of electric shavers are sold in the months of November and December); or the like.

The high demand alert generator 153 generates an alert associated with a product for which a high demand is identified. For example, the high demand alert generator 153 may determine that there is high demand for a new "Harry Potter" book that was recently published, or that there is high demand for a new action movie DVD that was recently released, and may generate a high demand alert associated with that book or DVD. The high demand is determined, for example, by measuring the number of orders placed for the product within a pre-defined time slot, and identifying a high demand relative to other time slots and/or relative to other products. For example, the high demand alert generator 153 may identify that the new "Harry Potter" book was purchased five times more, in the last 24 hours, in comparison with any other fiction book; or that the "Spider-Man" DVD was purchased three time more, in the last 48 hours, in comparison with previous sales of that DVD during the last two months.

The hot product alert generator 154 may generate a "hot product" alert associated with a product based on one or more sources indicating that the product is, or is expected to be, a product of high demand. For example, the hot item alert generator 154 may identify a "hot product" if a significant number of users added the product to their "wish list" or their "Listmania" or their "bridal registry"; if a significant number of users recommended the product to one or more other users; if a significant number of users placed the product in their shopping cart (e.g., without actually purchasing the product yet); if a significant number of users provided positive reviews or rankings related to a product; or the like. Other suitable conditions or criteria may be used to determine products that are "hot" temporarily (e.g., due to a new release or a long-awaited product) or generally (e.g., if many users are buying substantially any merchandise available in a certain category due to holiday season rush).

In some embodiments, the high demand alert generator 153 and/or the hot product alert generator 154 may be associated with a demand calculator 163 and/or a demand estimator 164. For example, the demand calculator 163 calculates the demand for a product in one or more time periods, and compares the current demand rate to past demand rates, in order to determine an increased demand or a decreased demand. The demand estimator 164 estimates a demand for a product (e.g., for a forward time interval) based on past demand rates, based on the current demand rate, and/or based on other information (e.g., a news feed, a list of soon-to-be-released products, a list of recently-released products, or the like).

The event-based alert generator 155 generates event-based alerts associated with a product based on one or more other pre-defined events or conditions. For example, if an external source (e.g., a news feed or a weather forecast feed) provides a snow alert or a hurricane alert for, an event-based alert may be generated with regard to particular products (e.g., snow coats, batteries, flashlights, canned food, or the like).

The modification determinator module 150 receives one or more alerts from alert generators 151-155, and applies one or more modification rules 158. In some embodiments, for example, the modification rules 158 indicate that upon receiving a low inventory alert, the remaining items of the low inventory product are automatically transferred from being offered through the fixed-price transaction route to being offered through the online auction route (e.g., until the inventory is exhausted, or until new stock arrives and the low inventory alert is cancelled, or for a pre-defined period of 48 hours). In some embodiments, for example, the modification rules 158 indicate that upon receiving a hot product alert, the hot product is automatically transferred from being offered through the fixed-price transaction route to being offered through the online auction route, e.g., for a pre-defined period of time (e.g., for 72 hours, or until the hot product alert is re-evaluated).

Based on the pre-set modification rules, the modification determinator module 150 determines, for example, that a product being offered for sale in a fixed-price transaction route is transferred to being offered for sale in an auction route, or vice versa; or to increase the fixed-price of a product offered for sale in a fixed-price transaction route; or to decrease the fixed-price of a product offered for sale in a fixed-price transaction route; or to provide a limited-time promotion (e.g., price discount, faster shipping, or the like) for particular products offered through a fixed-price transaction route; or to provide a limited-time promotion (e.g., price discount, faster shipping, or the like) for particular products offered through an online auction route; to modify an opening price of an auction of a product (e.g., if no bids were placed yet); to modify a closing time of an auction of a product (e.g., if no bids were placed yet); or to perform other modifications to terms of sale in a fixed-price route or to terms of sale in an auction route.

In some embodiments, the modification determinator module 150 applies the modification rules 158 subject to applying one or more filters 159, for example, in order to include or exclude products or types of products from the modification process. For example, in some embodiments, filters 159 may indicate that the sale terms of products of the type "books" may be modified by the modification rules 158; whereas the sale terms of products of the type "music" may not be modified by the modification rules 158. In some embodiments, filters 159 may indicate that the sale terms of products of the category "fiction books" may be modified by the modification rules 158; whereas the sale terms of products of the category "non-fiction books" may not be modified by the modification rules 158. In some embodiments, filters 159 may indicate that the sale terms of products having a price smaller than 36 USD may be modified by the modification rules 158; whereas the sale terms of products having a price equal to or greater than 36 USD may not be modified by the modification rules 158. In some embodiments, filters 159 may indicate that the sale terms of products manufactured by a first maker (e.g., "Sony") may be modified by the modification rules 158; whereas the sale terms of products manufactured by a second maker (e.g., "Apple") may not be modified by the modification rules 158. Other filtering criteria or combinations thereof may be used.

In some embodiments, the modification determinator module 150 receives one or more alerts from alert generators 151-155; applies one or more filters 159; and applies one or more modification rules 158. If one or more modifications are to be performed to sale terms of a product, the modification determinator module 150 performs the modifications of commands another module to perform the modifications. In some embodiments, a sale terms modifier module 160 receives input from the modification determinator module 150 and performs the sale term modifications. In some embodiments, sale term modifications are performed by the fixed-price transaction module 130, or by the auction module 140. In some embodiments, sale term modifications may optionally include modification of one or more records in the inventory database 120; for example, modification of the price 126, modification of shipping options 127, addition or removal of an indication or a flag that the product is being offered by fixed-price transactions and not by auctions (or vice versa), or the like.

In some embodiments, the modification rules 158 may include, or may be associated with, one or more pre-set algorithms and criteria for dynamic establishment of an online auction for sale of a product previously offered for sale using the fixed-price transaction route. For example, auction generation rules 161 may include formulas or calculations for dynamic determination of parameters required for establishment of an online auction, based on product information in the inventory database 120. In some embodiments, the auction generation rules 161 include a rule indicating that upon determination to transfer a product from being offered in a fixed-price transaction route to an auction route, an online auction is established with an opening price calculated in accordance with a pre-defined formula (e.g., twenty percent greater than the fixed price of the product); with shipping options determined in accordance with pre-defined criteria (e.g., free upgrade to expedited shipping in the auction route, in comparison with the fixed-price route); with other sale terms set in accordance with pre-defined criteria (e.g., free gift wrap for products having a price greater than a pre-defined threshold); with an auction period calculated automatically based on a pre-defined formula (e.g., between 12 hours to 96 hours, taking into account the inventory available, the demand for the product, or other parameters); and/or other auction parameters or sale terms calculated based on pre-defined auction generation rules 161 or modification rules 158.

In some embodiments, one or more visual indicators 162 are optionally used to bring the sale term modifications to the attention of the user. For example, a pop-up window, a foreground layer, a scrolling message, an animated message, or other visual indicator 162 is used to alert the user to a modification in sale terms of a product, e.g., a product that the user is currently viewing, a product that the user placed in his shopping cart, a product that the user placed in his "wish list", a product that the user viewed in the past, or the like. The visual indicators 162 may alert the user to the modification in the sale terms of the product. In some embodiments, the visual indicators 162 may include a mechanism (e.g., a hyperlink, a button, or the like) to facilitate the user's access to the modified route for purchasing the product, or an automatic redirection mechanism to the modified route for purchasing the product.

In some embodiments, optionally, the server 110 does not notify the user of the modification in sale terms, and performs the modifications in a way transparent to the user.

For example, in some embodiments, the user is not notified that the price of a product was recently increased or decreased due to the dynamic adaptation, or that the product was recently transferred from a fixed-price transaction route to an online auction route (or vice versa). For example, in some embodiments, once a user searches for a product that was recently transferred from the fixed-price transaction route to the online auction route, the user may be presented with an online interface, without mentioning that the item was previously offered for sale in a fixed-price transaction route. Similarly, once the user searches for a product associated with sale terms that were recently modified (e.g., an increase in product price due to low inventory of this product), the user may be presented with the updated (e.g., modified) sale terms, without mentioning that the item was previously offered for sale in accordance with other sale terms.

Figure 2:
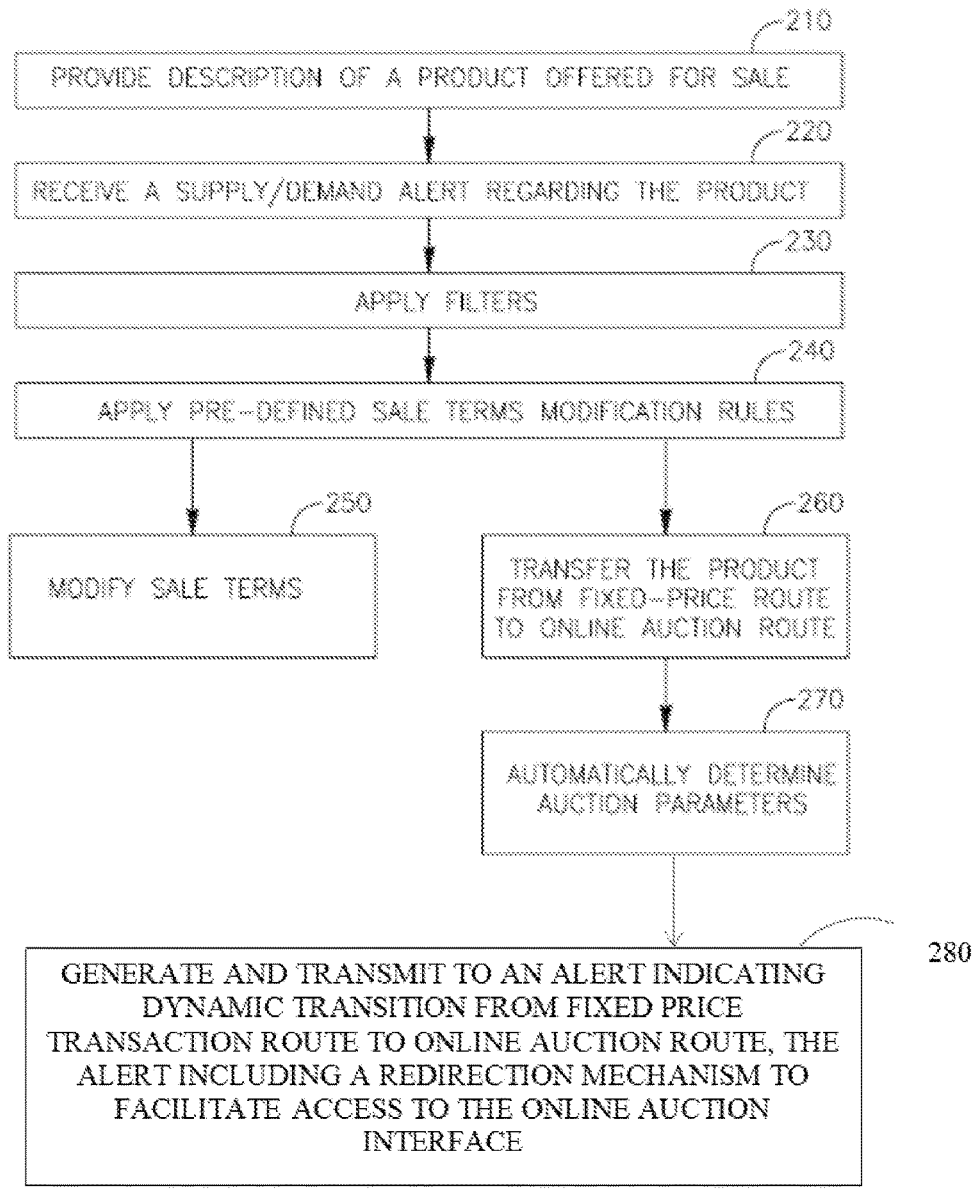
FIG. 2 is a schematic flow-chart of a method of dynamic modification of sale terms of online transactions in accordance with some demonstrative embodiments of the invention.

FIG. 2 is schematic flow-chart of a method of dynamic modification of sale terms of electronic transactions in accordance with some demonstrative embodiments of the invention. Operations of the method may be used, for example, by system 100 of FIG. 1, and/or by other suitable units, devices and/or systems.

In some embodiments, the method may include, for example, providing to one or more users a description of a product being offered for sale (block 210). This may be performed, for example, through a web-site or other electronic commerce system.

In some embodiments, the method may include, for example, receiving a supply/demand alert regarding the product (block 220).

In some embodiments, the method may include, for example, applying one or more filters to the product (block 230), e.g., product type filter, product category filters, product price filters, or the like, in order to determine whether or not sale terms associated with the product are modifiable.

In some embodiments, the method may include, for example, applying one or more pre-defined sale terms modification rules (block 240) with regard to the sale terms associated with the product.

In some embodiments, the method may include, for example, modifying one or more sale terms associated with the product in a fixed-price transaction route (block 250).

Alternatively, the method may include, for example, transferring the product from a fixed-price transaction route to an online auction route (block 260), as well as automatically determining one or more auction parameters (block 270) based on pre-defined auction establishment rules. Also, the method may include automatically generating and transmitting an alert indicating the dynamic transition from fixed price transaction route to online auction route, the alert including a redirection mechanism to facilitate access to the online auction interface (block 280).

Other suitable operations or sets of operations may be used in accordance with embodiments of the invention.

Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), a rigid magnetic disk, and an optical disk. Some demonstrative examples of optical disks include compact disk—read only memory (CD-ROM), compact disk—read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public network. In some embodiments, modems, cable modems and Ethernet cards are demonstrative example of types of network adapters. Other suitable components may be used.

Functions, operations, components and/or features described herein with reference to one or more embodiments, may be combined with, or may be utilized in combination with, one or more other functions, operations, components and/or features described herein with reference to one or more other embodiments, or vice versa.

While certain features of some embodiments of the invention have been illustrated and described herein, many modifications, substitutions, changes, and equivalents may occur to those skilled in the art. It is, therefore, to be understood that the appended claims are intended to cover all such modifications and changes.

What is claimed is:

1. A system for electronic transactions, the system comprising:
  a memory configured to store a set of sale terms associated with a product offered for sale; and
  at least one processor configured to execute:
  a fixed price transaction module configured to:
  generate a fixed price transaction interface comprising the set of sale terms associated with the product offered for sale, and
  transmit the fixed price transaction interface to a client for facilitating participation in a fixed price transaction route;
  a modification determination module configured to:
  receive a supply/demand alert associated with the product,
  determine based on one or more pre-defined sale terms modification rules, the supply/demand alert associated with the product and one or more product filters, whether or not to modify one or more terms of the set of sale terms; and dynamically transition from the fixed price transaction route to an online auction route based on one or more pre-defined auction generation rules and the supply/demand alert associated with the product;

an auction module configured to:

dynamically determine an auction opening price based on a calculation that takes into account a previous price of the product in the fixed-price transaction route;

automatically generate an online auction interface comprising the auction opening price and the modified one or more terms of the set of sale terms associated with the product offered for sale, and transmit the online auction interface to the client for facilitating participation in the online auction route, and in a case that the online auction route is not offered during the fixed price transaction route, a notification module configured to generate and transmit to the client an alert indicating the dynamic transition from the fixed price transaction route to the online auction route, the alert including a redirection mechanism to facilitate access to the online auction interface, wherein the one or more product filters exclude at least a group of products from the modification process.

2. The system of claim 1, wherein the supply/demand alert comprises an alert indicating high demand for the product based on one or more time-related conditions, and wherein the system comprises a time-based alert generator to generate said alert.

3. The system of claim 1, wherein the supply/demand alert comprises an alert indicating high demand for the product based on one or more date-related conditions, and wherein the system comprises a date-based alert generator to generate said alert.

4. The system of claim 1, wherein the supply/demand alert comprises an alert indicating high demand for the product based on one or more event-related conditions, and wherein the system comprises an event-based alert generator to generate said alert.

5. The system of claim 1, wherein the supply/demand alert comprises an alert indicating increased demand for the product, and wherein the system comprises a demand calculator to generate said alert.

6. The system of claim 1, wherein the supply/demand alert comprises an alert indicating low inventory for the product, and wherein the system comprises a low inventory alert generator to generate said alert.

7. The system of claim 1, wherein the at least one processor further comprises:

a sale terms modifier module configured to modify one or more terms of the set of sale terms based on the one or more pre-defined sale terms modification rules.

8. The system of claim 7, wherein the sale terms modifier module is further configured to transfer the product from the fixed-price transaction route to the online auction route.

9. The system of claim 7, wherein the notification module is configured to generate and transmit the notification to a plurality of clients that one or more of the set of sale terms for the product are modified.

10. A method for electronic transactions, the method comprising:

storing a set of sale terms associated with a product offered for sale;

generating, by a processor, a fixed price transaction interface comprising the set of sale terms associated with the product offered for sale, transmitting, by the processor, the fixed price transaction interface to a client for facilitating participation in a fixed price transaction route;

receiving, by the processor, a supply/demand alert associated with the product;

determining, by the processor, whether or not to modify one or more terms of the set of sale terms, based on the supply/demand alert, based on one or more pre-defined sale terms modification rules, and based on one or more product filters;

dynamically transitioning, by the processor, from the fixed price transaction route to an online auction route based on one or more pre-defined auction generation rules and the supply/demand alert associated with the product;

dynamically determining, by the processor, an auction opening price based on a calculation that takes into account a previous price of the product in the fixed-price transaction route;

automatically generating, by the processor, an online interface comprising the auction opening price and the modified one or more terms of the set of sale terms associated with the product offered for sale; and in a case that the online auction route is not offered during the fixed price transaction route, generating and transmitting to the client an alert indicating the dynamic transition from the fixed price transaction route to the online auction route, the alert including a redirection mechanism to facilitate access to the online auction interface, wherein the one or more product filters exclude at least a group of products from the modification process.

11. The method of claim 10, wherein receiving the supply/demand alert comprises:

receiving, by the processor, an alert indicating high demand for the product based on one or more time-related conditions.

12. The method of claim 10, wherein receiving the supply/demand alert comprises:

receiving, by the processor, an alert indicating high demand for the product based on one or more date-related conditions.

13. The method of claim 10, wherein receiving the supply/demand alert comprises:

receiving, by the processor, an alert indicating high demand for the product based on one or more event-related conditions.

14. The method of claim 10, wherein receiving the supply/demand alert comprises:

receiving, by the processor, an alert indicating increased demand for the product.

15. The method of claim 10, wherein receiving the supply/demand alert comprises:

receiving, by the processor, an alert indicating low inventory for the product.

16. The method of claim 10, comprising:

modifying, by the processor, one or more terms of the set of sale terms based on the supply/demand alert and the one or more pre-defined sale terms modification rules.

17. The method of claim 16, wherein modifying comprises:

transferring, by the processor, the product from the fixed-price transaction route to the online auction route.

18. A computer program product comprising a computer useable medium including a computer readable program, the computer useable medium not being a signal and the computer readable program when executed on a computer causes the computer to perform a method comprising:

storing a set of sale terms associated with a product offered for sale;

generating a fixed price transaction interface comprising the set of sale terms associated with the product offered for sale, transmitting the fixed price transaction interface to a client for facilitating participation in a fixed price transaction route;

receiving a supply/demand alert associated with the product;

determining whether or not to modify one or more terms of the set of sale terms, based on the supply/demand alert, based on one or more pre-defined sale terms modification rules, and based on one or more product filters, dynamically transition from the fixed price transaction route to an online auction route based on one or more pre-defined auction generation rules and the supply/demand alert associated with the product; automatically generating an online interface comprising the auction opening price and the modified one or more terms of the set of sale terms associated with the product offered for sale; and in a case that the online auction route is not offered during the fixed price transaction route, generating and transmitting to the client an alert indicating the dynamic transition from the fixed price transaction route to the online auction route, the alert including a redirection mechanism to facilitate access to the online auction interface, wherein the one or more product filters exclude at least a group of products from the modification process.

19. A system for online transactions, the system comprising:

a product database to store a set of sale terms associated with a product offered for sale in a fixed-price transaction route;

a supply/demand alert generator to generate a supply/demand alert associated with the product, the supply/demand alert selected from the group comprising:

an alert indicating increased demand for the product; and an alert indicating low inventory for the product;

and an electronic commerce server comprising a processor configured to:

generate a fixed price transaction interface comprising the set of sale terms associated with the product offered for sale, transmit the fixed price transaction interface to a client for facilitating participation in a fixed price transaction route;

receive a supply/demand alert associated with the product;

determine whether or not to modify one or more terms of the set of sale terms, based on the supply/demand alert, based on one or more pre-defined sale terms modification rules, and based on one or more product filters;

dynamically transition from the fixed price transaction route to an online auction route based on one or more pre-defined auction generation rules and the supply/demand alert associated with the product;

dynamically determine an auction opening price based on a calculation that takes into account a previous price of the product in the fixed-price transaction route;

automatically generate an online interface comprising the auction opening price and the modified one or more terms of the set of sale terms associated with the product offered for sale; and in a case that the online auction route is not offered during the fixed price transaction route, generate and transmit to the client an alert indicating the dynamic transition from the fixed price transaction route to the online auction route, the alert including a redirection mechanism to facilitate access to the online auction interface, wherein the one or more product filters exclude at least a group of products from the modification process.

20. The system of claim 1, wherein the auction module is further configured to adjust a time period of the online auction route based on the supply/demand alert.

* * * * *